United States Patent Office 3,828,089
Patented Aug. 6, 1974

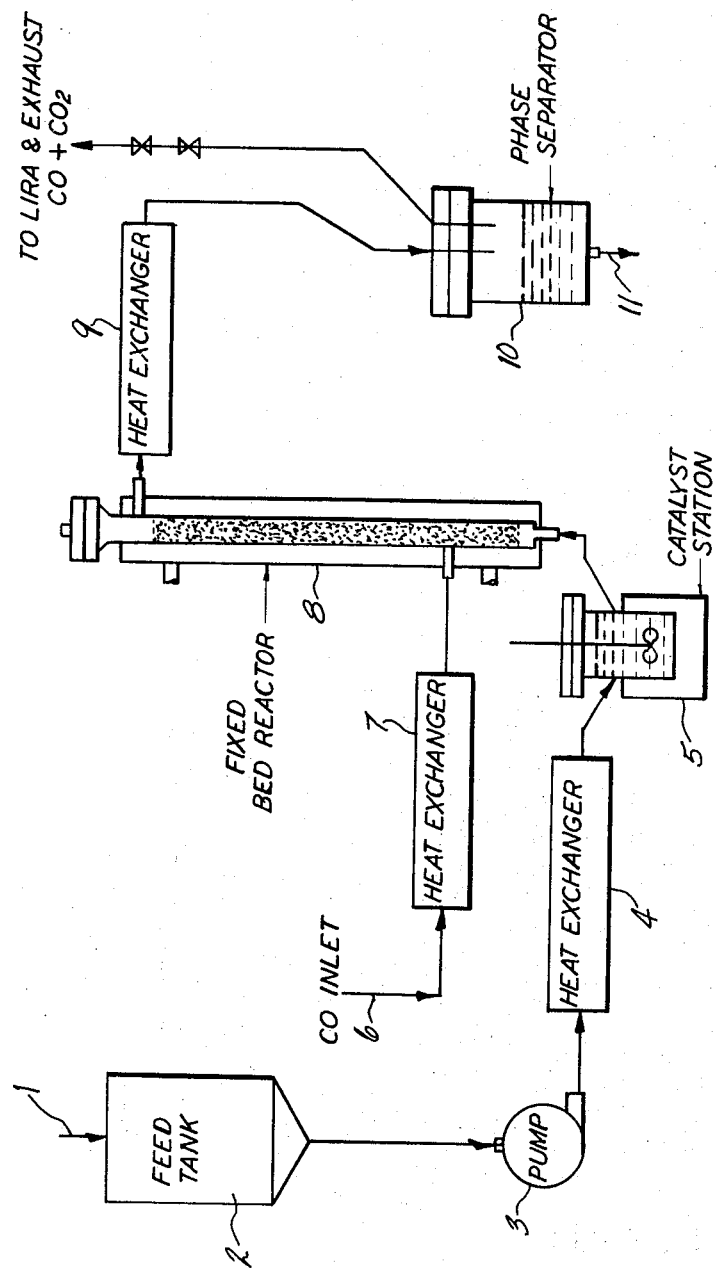

3,828,089
PREPARATION OF AROMATIC ISOCYANATES IN FIXED BED REACTOR
Philip D. Hammond, North Haven, Conn., John A. Scott, Joliet, Ill., and William M. Clarke, North Haven, and William I. Denton, Cheshire, Conn., assignors to Olin Corporation
Filed Dec. 1, 1972, Ser. No. 311,055
Int. Cl. C07c 119/04
U.S. Cl. 260—453 PC    12 Claims

ABSTRACT OF THE DISCLOSURE

Aromatic isocyanates are produced directly from aromatic nitro compounds in a continuous process in which carbon monoxide and aromatic nitro compounds are reacted in a fixed bed reactor in the presence of a solvent and soluble catalyst.

---

This invention relates to a continuous process for preparing aromatic isocyanates from aromatic nitro compounds using a fixed bed reactor.

There is an increasing demand for organic isocyanates for use in the preparation of urethane foams and coatings, as well as in the preparation of insecticides, pesticides and the like.

Considerable effort has been expended recently in developing processes for preparing aromatic isocyanates directly from aromatic nitro compounds by reacting the aromatic nitro compound with carbon monoxide in the presence of a noble metal catalyst, particularly palladium halides and rhodium halides, and generally utilizing a cocatalyst. For example, U.S. Pat. No. 3,576,835 discloses the use of a catalyst comprised of a noble metal halide and a heteroaromatic nitrogen compound. In addition, U.S. Pat. No. 3,523,966 discloses the use of a noble metal-based catalyst and certain non-noble metal-based catalysts. Although the techniques described in these patents are useful in preparing aromatic isocyanates, there is a need for improving the economics of such techniques in order to make the process more profitable.

Generally, previous techniques have employed stirred reactors using intense agitation to produce the turbulent flow of liquid and gas needed to obtain efficient mass transfer. This involves the use of fully baffled reactors which not only are extremely expensive but also are large in size and thus consume large amounts of space. Additionally filtration or some other suitable solid-liquid separation technique is needed to recover the unused catalyst.

Now it has been discovered, that aromatic isocyanates can be prepared in a continuous process by reacting an aromatic nitro compound with carbon monoxide in a fixed bed reactor in the presence of a solvent and soluble catalyst and preferably in the presence of a promoter. This is an entirely unexpected result since previous work in stirred reactors has been dependent on efficient mass transfer of gas to liquid obtained through the turbulent flow produced by vigorous agitation.

The process of this invention has the desirable advantages of being continuous, employs simple and economical equipment, and has the capability of easily recovering the catalyst that is removed from the reactor. This process is illustrated in more detail in the accompanying figure which is a schematic flow sheet.

Liquid feed solution (1) made up of the aromatic nitro compound and solvent is fed to a feed tank (2) and then pumped (3) through a heat exchanger (4) to preheat the solution to the desired temperature. The solution then is fed to a catalyst station (5) which has been charged with catalyst and is in effect a catalyst dissolving vessel. In the catalyst station the feed solution picks up catalyst and then continues on to the fixed bed reactor (8). Carbon monoxide gas (6) under the desired pressure is preheated in a heat exchanger (7) and then is also fed into the reactor (8). The reactor contains a fixed bed which is essentially made up of a material such as carbon and may include a promoter supported thereon. After the aromatic nitro compound which is in solution in the solvent and dissolved catalyst contacts and reacts with the carbon monoxide in the reactor (8), the reactor effluent of gas and liquid is cooled in a heat exchanger (9) before flowing to a phase separator (10) where the carbon monoxide gas is separated from the liquid product contained in the discharge line (11). The isocyanate product can readily be separated from this product solution and the catalyst recovered and recycled back to the catalyst station (5).

In carrying out the method of this invention any aromatic nitro compound capable of being converted to an aromatic isocyanate may be employed as a reactant. As used herein, the term "aromatic nitro compound" represents those organic compounds having at least one nitro group attached directly to an aromatic hydrocarbon or carbocyclic nucleus such as benzene, naphthalene and the like, wherein the aromatic nucleus may also contain other substituents as illustrated below. Among the preferred aromatic nitro compounds which may be used in the practice of this invention are the nitrobenzenes, both mono- and polynitro, including isomeric mixtures thereof; the alkyl-nitrobenzenes, including the various nitrated toluenes and the nitrated xylenes; nitrated biphenyl and nitrated diphenylmethanes. Other preferred reactants include bis-(nitrophenoxy)alkanes and bis(nitrophenoxy) alkylene ethers. Typical examples of suitable aromatic nitro compounds which can be reacted to form isocyanates include the following:

(a) Nitrobenzene
(b) Nitronaphthalenes
(c) Nitroanthracenes
(d) Nitrobiphenyls
(e) Bis(nitrophenyl) methanes
(f) Bis(nitrophenyl) thioethers
(g) Bis(nitrophenyl) ethers
(h) Bis(nitrophenyl) sulfones
(i) Nitrodiphenoxy alkanes
(j) Nitrophenothiazines All of the aforementioned compounds may be substituted with one or more additional substituents such as nitro, alkykl, alkoxy, aryloxy, halogen, alkylthio, arylthio, carboxyalkyl, cyano, isocyanato, and the like, and employed as reactants in the novel process of this invention. Specific examples of suitable substituted-nitro compounds which can be used are as follows:

1. o-Nitrotoluene
2. m-Nitrotoluene
3. p-Nitrotoluene
4. o-Nitro-p-xylene
5. 2-Methyl-1-nitronaphthalene
6. m-Dinitrobenzene
7. p-Dinitrobenzene
8. 2,4-Dinitrotoluene
9. 2,6-Dinitrotoluene
10. Dinitromesitylene
11. 4,4'-Dinitrobiphenyl
12. 2,4-Dinitrobiphenyl
13. 4,4'-Dinitrobibenzyl
14. Bis(p-nitrophenyl)methane
15. Bis(2,4-dinitrophenyl)methane
16. Bis(p-nitrophenyl) ether
17. Bis(2,4-dinitrophenyl)ether
18. Bis(p-nitrophenyl) thioether
19. Bis(p-nitrophenyl) sulfone
20. Bis(p-nitrophenoxy) ethane
21. Bis(p-nitrophenoxy) diethylene ether 22. 2,4,6-Trinitrotoluene
23. 1,3,5-Trinitrobenzene
24. 1-Chloro-2-nitrobenzene
25. 1-Chloro-4-nitrobenzene
26. 1-Chloro-3-nitrobenzene
27. Nitrodiphenyl methane
28. 2-Chloro-6-nitrotoluene
29. 4-Chloro-3-nitrotoluene
30. 1-Chloro-2,4-dinitrobenzene
31. 1,4-Dichloro-2-nitrobenzene
32. α-Chloro-p-nitrotoluene
33. 1,3,5-Trichloro-2-nitrobenzene
34. 1,3,5-Trichloro-2,4-dinitrobenzene
35. 1,2-Dichloro-4-nitrobenzene
36. α-Chloro-m-nitrotoluene
37. 1,2,4-Trichloro-5-nitrobenzene
38. 1-Bromo-4-nitrobenzene
39. 1-Bromo-2-nitrobenzene
40. 1-Bromo-3-nitrobenzene
41. 1-Bromo-2,4-dinitrobenzene
42. α,α-Dibromo-p-nitrotoluene
43. α-Bromo-p-nitrotoluene
44. 1-Fluoro-4-nitrobenzene
45. 1-Fluoro-2,4-dinitrobenzene
46. 1-Fluoro-2-nitrobenzene
47. o-Nitrophenyl isocyanate
48. m-Nitrophenyl isocyanate
49. p-Nitrophenyl isocyanate
50. o-Nitroanisole
51. p-Nitroanisole
52. p-Nitrophenetole
53. o-Nitrophenetole
54. 2,4-Dinitrophenetole
55. 2,4-Dinitroanisole
56. 1-Chloro-2,4-dimethoxy-5-nitrobenzene
57. 1,4-Dimethoxy-2-nitrobenzene
58. m-Nitrobenzaldehyde
59. p-Nitrobenzaldehyde
60. p-Nitrobenzoylchloride
61. m-Nitrobenzoylchloride
62. 3,5-Dinitrobenzoylchloride
63. Ethyl p-nitrobenzoate.
64. Methyl o-nitrobenzoate
65. m-Nitrobenzenesulfonylchloride
66. p-Nitrobenzenesulfonylchloride
67. o-Nitrobenzenesulfonylchloride
68. 4-Chloro-3-nitrobenzenesulfonylchloride
69. 2,4-Dinitrobenzenesulfonylchloride
70. 3-Nitrophthalic anhydride
71. p-Nitrobenzonitrile
72. m-Nitrobenzonitrile
73. 3,3'-Dimethoxy-4,4'-dinitro-biphenyl
74. 3,3'-Dimethyl-4,4'-dinitro-biphenyl
75. 2-Isocyanato-4-nitrotoluene
76. 4-Isocyanato-2-nitrotoluene In addition, isomers and mixtures of the aforesaid aromatic nitro compounds and substituted aromatic nitro compounds may also be employed, as well as homologues and other related compounds. Generally, the aromatic nitro compounds contain from 6 to 20 and preferably from 6 to 14 carbon atoms.

Any catalyst which is capable of enhancing the conversion of aromatic nitro compounds to aromatic isocyanates and has an appreciable solubility with the reaction medium may be employed in the process of this invention. More particularly, the catalyst used in this invention may be a complex or mixture of at least one heteroaromatic nitrogen compound with at least one noble metal halide. The heteroaromatic nitrogen compound is one containing between five and six members in the ring, containing only nitrogen and carbon in the ring, containing no more than two nitrogen atoms in the ring, and containing at least two double bonds in the ring. Suitable compounds of this type are disclosed in the Ring Index by Patterson and Capell, Second Edition, American Chemical Society, 1960 and Supplements I, II and III and in U.S. Pat. 3,576,835. Derivatives of the heteroaromatic nitrogen compounds such as disclosed in U.S. 3,576,835 may also be used. The preferred heteroaromatic nitrogen compounds are pyridine, quinoline and isoquinoline.

Any noble metal halide capable of forming a complex with the above-described heteroaromatic nitrogen compound may be used. Useful noble metals include palladium, rhodium, ruthenium, platinum, osmium, iridium, rhenium, silver and gold with the metals of the platinum series, i.e. palladium, rhodium, ruthenium, platinum, osmium and iridium being preferred. The most preferred noble metals are palladium, rhodium, platinum, and iridium and chloride is the most preferred halide. Typical examples of suitable halides include palladous dibromide, palladous dichloride, palladous difluoride, palladous diiodide, rhodium tribromide, rhodium trichloride, rhodium trifluoride, rhodium triiodide; platinic bromide, platinous bromide, platinic chloride, platinous chloride, platinic fluoride, platinous iodide, platinic iodide, rhenium trichloride, rhenium tetrachloride, rhenium tetrafluoride, rhenium hexafluoride, rhenium tribromide, iridium tribromide, iridium tetrabromide, iridium dichloride, iridium trichloride, iridium tetrachloride, iridium triodide, iridium tetraiodide, and mixtures thereof. Preferred noble metal halides are selected from the group consisting of palladous dichloride, rhodium trichloride, iridium trichloride and platinum tetrachloride and mixtures thereof, the more preferred noble metal halides being palladous dichloride and rhodium trichloride.

Particularly preferred catalyst complexes are Pd(pyridine)$_2$Cl$_2$, Pd(pyridine)$_2$Cl$_4$, Rh(pyridine)$_3$Cl$_3$, Pd(isoquinoline)$_2$Cl$_2$, Pd(isoquinoline)$_2$Cl$_4$ and Rh(isoquinoline)$_3$Cl$_3$. Further disclosure of catalysts of this type and the method of preparation may be found in U.S. Pat. No. 3,576,835, issued Apr. 27, 1971 to Eric Smith et al.

In addition to the above described catalyst complexes or mixtures, the catalyst system may include a co-catalyst such as pyridine hydrochloride.

Any solvent which is chemically inert to the components of the reaction system may be employed. Suitable solvents include aliphatic, cycloaliphatic and aromatic solvents such as n-heptane, cyclohexane, benzene, toluene and xylene, and halogenated aliphatic and aromatic hydrocarbons such as dichloromethane, tetrachloroethane, monochlorobenzene, dichlorobenzene, trichlorobenzene, perchloroethylene, aromatic nitro compounds such as nitrobenzene, mixtures thereof and the like. It is preferred to employ dichlorobenzene as the solvent.

The reactor bed is made up of a material such as carbon (activated), alumina, silica, barium sulfate, calcium carbonate, asbestos, bentonite, diatomaceous earth, fuller's earth, and analogous materials. The preferred reactor bed material is carbon and more preferably activated carbon.

The reactor preferably may also contain a promoter which is supported on a reactor bed material of the type disclosed above. Useful promoters include the metal oxides wherein said metal is selected from the group consisting of molybdenum, chromium, tungsten, vanadium, niobium and tantalum. These elements are found in Groups V–B and VI–B of the Periodic Table and are further described in U.S. Pat. 3,576,835. Suitable oxides of this type include chromic oxide ($Cr_2O_3$), chromium dioxide ($CrO_2$), and chromous oxide (CrO); molybdenum sesquioxide ($Mo_2O_2$), molybdenum dioxide ($MoO_2$) and molybdenum trioxide ($MoO_3$); niobium monoxide (NbO), niobium oxide ($NbO_2$), and niobium pentoxide ($Nb_2O_5$); tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); vanadium dioxide ($V_2O_2$), vanadium trioxide ($V_2O_3$), vanadium tetraoxide ($V_2O_4$) and vanadium pentoxide ($V_2O_5$). One of the preferred metal oxides is molybdenum trioxide.

Generally the quantity of carbon monoxide in the free space of the reactor is sufficient to maintain the desired pressure as well as provide reactant for the process. The pressure at which the carbon monoxide is fed to the reactor is generally between 30 and 10,000 p.s.i.g. and preferably between 1,000 and 5,000. Greater or lesser pressures may be employed if desired.

The total amount of carbon monoxide added during the reaction is generally between about 3 and about 50 and preferably between about 8 and about 15 moles of carbon monoxide per nitro group in the aromatic nitro compound, however, greater or lesser amounts may be employed if desired.

The reaction is carried out in the presence of a catalytic proportion of the catalyst. More particularly, the proportion of catalyst is generally equivalent to from about 0.001 to about 500 percent, and preferably from about 1 to about 100 percent by weight of the aromatic nitro compound. Greater or lesser amounts may be employed if desired.

The amount of solvent which may be used is not critical and generally the weight percent of aromatic nitro compound in the solvent will be in the range between about 2.0 and 75 percent, but greater or lesser proportions may be employed if desired.

The reaction temperature is generally maintained above about 150° C. and more particularly from about 150 to about 300° C. and preferably from about 190 to about 220° C. Interior and/or exterior heating and cooling means may be employed to maintain the temperature in the reactor within the desired range.

The reaction time will vary widely and is dependent upon the aromatic nitro compound being reacted, temperature, pressure and on the amount of catalyst being charged, as well as the type of equipment being employed. Usually between about 10 and 90 minutes residence time in the reactor is required to obtain the desired degree of reaction.

The following examples are presented to describe the invention more fully without any intention of being limited thereby. All parts and percentages are by weight unless otherwise specified.

EXAMPLE I

A mixture of 10% by weight dinitrotoluene in orthodichlorobenzene was pumped through a catalyst station which contained a palladium pyridine catalyst complex of the formula $Pd(pyridine)_2Cl_2$ and was maintained at a temperature of 160° C. The solution which contained dissolved catalyst was then fed into the reactor which was a jacketed Schedule 80 stainless steel tube (1" ID x 36"). The reactor contained a fixed bed of 10% $CrO_3$ on alumina ($Al_2O_3$) pellets and was maintained at a temperature of 200° C. and a pressure of 3,000 p.s.i.g. Carbon monoxide gas was preheated to reaction temperature and fed at a pressure of 3,000 p.s.i.g. into the reactor where it contacted the solution containing dinitrotoluene and catalyst. Residence time of the dinitrotoluene in the reactor was approximately 25 minutes.

The liquid-gas stream then left the reactor and entered a phase separator where the gas and liquid were separated. The liquid product as analyzed by vapor phase chromatography (VPC) showed a 28% conversion of dinitrotoluene, a 15% yield of toluene diisocyanate and a 23% yield of total product i.e. toluene diisocyanate plus nitrotolyl isocyanates.

EXAMPLE II

The same procedure as in Example I was followed except that a 20% by weight dinitrotoluene in orthodichlorobenzene feed solution was used and the fixed bed was made up of activated carbon.

The conversion of dinitrotoluene was 25%, yield of toluene diisocyanate was 3% and the yield of total product was 60%.

EXAMPLE III

The same procedure as in Example I was followed except that the fixed bed was made up of activated carbon, the catalyst was a palladium pyridine complex of the formula $Pd(pyridine)_2Cl_2$ combined with pyridine hydrochloride, the residence time was 50 minutes and the temperature in the catalyst station was 190° C.

The conversion of dinitrotoluene was 50%, the yield of toluene diisocyanate was 10% and the yield of total products was 83%.

EXAMPLE IV

The same procedure as in Example I was followed except that the fixed bed was made up of 10% $MoO_3$ on activated carbon, the residence time was 65 minutes and the temperature of the catalyst station was 190° C.

The conversion of dinirotoluene was 50%, yield of toluene diisocyanate was 15% and yield of total products was 80%.

EXAMPLE V

The same procedure as in Example I was followed except that the fixed bed was made up of 10% $MoO_3$ on activated carbon, the catalyst was a palladium pyridine complex of the formula $Pd(pyridine)_2Cl_2$ combined with pyridine hydrochloride, the residence time was 65 minutes and the temperature of the catalyst station was 190° C.

The conversion of dinitrotoluene was 89%, the yield of toluene diisocyanate was 45% and the yield of total products was 80%.

What is claimed is:

1. A continuous process for preparing an aromatic isocyanate which comprises reacting an aromatic nitro compound with carbon monoxide in a fixed bed reactor at an elevated temperature and pressure in the presence of a solvent and a soluble catalyst complex or mixture comprised of:
   (a) a heteroaromatic nitrogen compound having a ring containing
       (i) between 5 and 6 members,
       (ii) only nitrogen and carbon,
       (iii) no more than two nitrogen atoms and
       (iv) at least two double bonds and
   (b) a noble metal halide, said aromatic nitro compound, said solvent and said soluble catalyst complex or mixture being fed to the fixed bed reactor as a liquid feed solution.

2. The process of claim 1 wherein said heteroaromatic nitrogen compound is selected from the group consisting of pyridine, quinoline and isoquinoline and said noble metal halide is selected from the group consisting of the chlorides of palladium, rhodium, platinum and iridium.

3. The process of claim 1 wherein said aromatic nitro compound contains from 6 to 20 carbon atoms.

4. The process of claim 3 wherein said elevated temperature is from about 150 to about 300° C. and said elevated pressure is from about 30 to about 10,000 p.s.i.g.

5. The process of claim 3 wherein the proportion of said catalyst is from about 0.001 to about 500 percent by weight of said aromatic nitro compound.

6. The process of claim 5 wherein said heteroaromatic nitrogen compound is selected from the group consisting of pyridine, quinoline and isoquinoline and said noble metal halide is selected from the group consisting of the chlorides of palladium, rhodium, platinum and iridium.

7. The process of claim 6 wherein said reactor bed is made up of a material selected from the group consisting of carbon, alumina, silica, barium sulfate, calcium carbonate, asbestos, bentonite, diatomaceous earth and fuller's earth.

8. The process of claim 7 wherein said reactor contains an oxide of a metal selected from the group consisting of molybdenum, chromium, tungsten, vanadium, niobium and tantalum supported on said reactor bed material.

9. The process of claim 8 wherein said catalyst is a complex selected from the group consisting of Pd(pyridine)$_2$Cl$_2$, Pd(pyridine)$_2$Cl$_4$, Rh(pyridine)$_3$Cl$_3$, Pd(isoquinoline)$_2$Cl$_2$, Pd(isoquinoline)$_2$Cl$_4$ and Rh(isoquinoline)$_3$Cl$_3$.

10. The process of claim 9 wherein said aromatic nitro compound is dinitrotoluene and said solvent is dichlorobenzene.

11. The process of claim 7 wherein pyridine hydrochloride is included as a co-catalyst.

12. The process of claim 7 wherein said reactor bed material is activated carbon.

References Cited

UNITED STATES PATENTS

| | | | |
|---|---|---|---|
| 3,576,835 | 4/1971 | Smith et al. | 260—453 |
| 3,737,445 | 6/1973 | Dodman et al. | 260—453 |

LEWIS GOTTS, Primary Examiner

D. H. TORRENCE, Assistant Examiner